(12) United States Patent
Hidaka

(10) Patent No.: US 11,132,276 B2
(45) Date of Patent: Sep. 28, 2021

(54) NETWORK APPARATUS, MANAGEMENT APPARATUS, SENSING SYSTEM, DATA TRANSFER METHOD, MANAGEMENT METHOD, SENSING METHOD, AND COMPUTER-READABLE RECORDING MEDIUM

(71) Applicant: NEC CORPORATION, Tokyo (JP)

(72) Inventor: Youichi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 16/498,794

(22) PCT Filed: Mar. 1, 2018

(86) PCT No.: PCT/JP2018/007882
§ 371 (c)(1),
(2) Date: Sep. 27, 2019

(87) PCT Pub. No.: WO2018/180183
PCT Pub. Date: Oct. 4, 2018

(65) Prior Publication Data
US 2020/0034264 A1    Jan. 30, 2020

(30) Foreign Application Priority Data
Mar. 29, 2017   (JP) .............................. JP2017-066186

(51) Int. Cl.
*G06F 11/30* (2006.01)
*G06F 11/34* (2006.01)
*H04L 29/08* (2006.01)

(52) U.S. Cl.
CPC .......... *G06F 11/3058* (2013.01); *G06F 11/34* (2013.01); *H04L 69/323* (2013.01); *H04L 69/324* (2013.01)

(58) Field of Classification Search
CPC ............. G06F 11/3006; G06F 11/3058; G06F 11/3089; G06F 11/34; G06F 11/3476;
(Continued)

(56) References Cited

U.S. PATENT DOCUMENTS

2005/0110000 A1* 5/2005 Iida ...................... G01B 11/245
257/1
2005/0267639 A1* 12/2005 Sharma .............. G05D 23/1931
700/276
(Continued)

FOREIGN PATENT DOCUMENTS

JP       59-182384 A    10/1984
JP       60-17049 U     2/1985
(Continued)

OTHER PUBLICATIONS

Communication dated Nov. 5, 2019, from the Japanese Patent Office in Application No. 2017-066186.
(Continued)

*Primary Examiner* — Kan Yuen
(74) *Attorney, Agent, or Firm* — Sughrue Mion, PLLC

(57) ABSTRACT

A network apparatus 10 is provided with a physical layer processing unit 11 configured to generate physical layer information related to a physical layer of data in accordance with processing to transmit/receive the data, and a transmission unit 12 configured to transmit the data to a destination and to also the transmit physical layer information to a recipient separate from the destination.

5 Claims, 8 Drawing Sheets

(58) Field of Classification Search
CPC ......... G06F 13/00; G08C 15/00; H04L 67/12; H04L 67/1034; H04L 43/00; H04L 43/04; H04L 43/045; H04L 43/067; H04L 43/08; H04L 43/18; H04L 69/323; H04L 69/324; H04M 11/00; H04Q 9/00
See application file for complete search history.

(56) References Cited

U.S. PATENT DOCUMENTS

| | | | |
|---|---|---|---|
| 2012/0054527 A1* | 3/2012 | Pfeifer ................. | G06F 11/203 713/340 |
| 2018/0181868 A1* | 6/2018 | Chew ...................... | G06N 3/08 |
| 2019/0121350 A1* | 4/2019 | Cella ...................... | H04L 67/12 |
| 2020/0034264 A1* | 1/2020 | Hidaka ............... | G06F 11/3058 |

FOREIGN PATENT DOCUMENTS

| | | |
|---|---|---|
| JP | 07-159244 A | 6/1995 |
| JP | 10-197296 A | 7/1998 |
| JP | 2000-91993 A | 3/2000 |
| JP | 2003-221845 A | 8/2003 |
| JP | 2011-211833 A | 10/2011 |

OTHER PUBLICATIONS

Communication dated Jan. 21, 2020 by the Japanese Patent Office in application No. 2017-066186.
International Search Report for PCT/JP2018/007882 dated May 15, 2018 [PCT/ISA/210].

\* cited by examiner

Fig.5

|  | NETWORK APPARATUS A | NETWORK APPARATUS B | NETWORK APPARATUS C |
|---|---|---|---|
| TIME 00:00:00 | ELECTRICAL LEVEL 00 | LIGHT LEVEL 00 | ELECTRICAL LEVEL 00 |
| TIME 00:00:10 | ELECTRICAL LEVEL 00 | LIGHT LEVEL 00 | ELECTRICAL LEVEL 00 |
| TIME 00:00:20 | ELECTRICAL LEVEL 01 | LIGHT LEVEL 00 | ELECTRICAL LEVEL 00 |
| TIME 00:00:30 | ELECTRICAL LEVEL 00 | LIGHT LEVEL 00 | ELECTRICAL LEVEL 00 |
| TIME 00:00:40 | ELECTRICAL LEVEL 00 | LIGHT LEVEL 02 | ELECTRICAL LEVEL 00 |
| TIME 00:00:50 | ELECTRICAL LEVEL 00 | LIGHT LEVEL 03 | ELECTRICAL LEVEL 00 |
| TIME 00:01:00 | ELECTRICAL LEVEL 02 / Linkdown ERROR | Linkdown ERROR | Linkdown ERROR |

Fig.6

FIELD STATE TABLE T01

| LIGHT LEVEL | ACCELERATION (Gal) |
|---|---|
| 00 | ~0.6 (SEISMIC INTENSITY 0) |
| 01 | 0.6~2 (SEISMIC INTENSITY 1) |
| 02 | 2~6 (SEISMIC INTENSITY 2) |
| ... | ... |
| FF | 600 or more (SEISMIC INTENSITY 7) |

FIELD STATE TABLE T02

| ELECTRICAL LEVEL | TEMPERATURE STATE (°C) |
|---|---|
| 00 | 30 |
| 01 | 40 |
| 02 | 50 |
| ... | ... |
| FF | 100 |

NETWORK APPARATUS, MANAGEMENT APPARATUS, SENSING SYSTEM, DATA TRANSFER METHOD, MANAGEMENT METHOD, SENSING METHOD, AND COMPUTER-READABLE RECORDING MEDIUM

CROSS REFERENCE TO RELATED APPLICATIONS

This application is a National Stage of International Application No. PCT/JP2018/007882 filed Mar. 1, 2018, claiming priority based on Japanese Patent Application No. 2017-066186 filed Mar. 29, 2017.

TECHNICAL FIELD

The present invention relates to a network apparatus configured to transfer data, a management apparatus configured to manage the network apparatus, a sensing system employing the network apparatus and the management apparatus, a data transfer method, a management method, and a sensing method, and furthermore relates to a computer-readable recording medium where a program for realizing these is recorded.

BACKGROUND ART

Infrastructure facilities, for example such as roads, tracks, bridges, power supply networks, water and sewage facilities, and the like, need to be properly managed for social stability. For this reason, in such infrastructure facilities, sensors are disposed throughout the facilities in order to detect the state of each part of the facilities (for example, see Patent Documents 1 and 2).

For example, Patent Document 1 discloses a system for monitoring the state of soil and rock where infrastructure facilities are disposed. The system disclosed in Patent Document 1 includes a large number of sensors disposed in soil and rock, and a management apparatus. The sensors detect an elastic wave that propagates in the ground, and transmit a signal indicating the detected elastic wave to the management apparatus. The management apparatus determines the state of the soil and rock where the infrastructure facilities are disposed based on the signals transmitted from the respective sensors.

Also, Patent Document 2 discloses a system including a monitoring terminal station, a parent station monitoring center, and a wide area central monitoring center. In the system disclosed in Patent Document 2, the monitoring terminal station includes various sensors, and collects state information of water and sewage facilities from these sensors. Also, the monitoring terminal station transmits the collected state information to the parent station monitoring center and the wide area central monitoring center through public communications lines. The parent station monitoring center monitors water and sewage facilities in a corresponding region based on the transmitted state information. The wide area central monitoring center monitors water and sewage facilities throughout the entire region.

LIST OF RELATED ART DOCUMENTS

Patent Documents

Patent Document 1: Japanese Patent Laid-Open Publication No. H10-197296
Patent Document 2: Japanese Patent Laid-Open Publication No. 2003-221845

SUMMARY OF INVENTION

Problems to be Solved by the Present Invention

Using the above-described systems, it is expected to be possible to properly manage infrastructure facilities from a remote location, but in order to realize these systems, it is necessary to install a large number of sensors across a wide area. Therefore, the following problems occur.

First, because it is necessary to install a power supply device and a communications device for transmitting information for each sensor, there is a problem that the installation and operation of sensors is costly. Moreover, the location where a sensor is installed is often exposed to wind and rain, so there is also a problem that the life of the sensor, the power supply device, and the communications device is shorter than when these are installed indoors. Also, in order to expand the sensing range, it is necessary to install sensors, power supply devices, and communications devices as described above, so there is also a problem that expanding the sensing range is difficult.

An example object of the present invention is to provide a network apparatus, a management apparatus, a sensing system, a data transfer method, a management method, a sensing method, and a computer-readable recording medium that address the above problems, such that it is possible to expand the sensing range and reduce cost in a sensing system.

Means for Solving the Problems

In order to achieve the example object described above, a network apparatus according to an example aspect of the present invention includes:

a physical layer processing unit configured to generate physical layer information related to a physical layer of data in accordance with processing to transmit/receive the data; and a transmission unit configured to transmit the data to a destination and to also transmit the physical layer information to a recipient separate from the destination.

In order to achieve the example object described above, a management apparatus according to an example aspect of the present invention is an apparatus connected to a network apparatus provided with a physical layer processing unit configured to generate physical layer information related to a physical layer of data in accordance with processing to transmit/receive the data, and a transmission unit configured to transmit the data to a destination and to also transmit the physical layer information to the management apparatus separate from the destination, the management apparatus including:

an information acquisition unit configured to acquire the physical layer information transmitted from the network apparatus; and a state determination unit configured to determine a state of surroundings of the network apparatus based on the acquired physical layer information.

In order to achieve the example object described above, a sensing system according to an example aspect of the present invention includes:

a network apparatus, and a management apparatus, the network apparatus including:

a physical layer processing unit configured to generate physical layer information related to a physical layer of data in accordance with processing to transmit/receive the data, and a transmission unit configured to transmit the data to a destination and to also transmit the physical layer information to the management apparatus separate from the destination, and the management apparatus including:

an information acquisition unit configured to acquire the physical layer information transmitted from the network apparatus, and a state determination unit configured to determine a state of surroundings of the network apparatus based on the acquired physical layer information.

Also, in order to achieve the example object described above, a data transfer method according to an example aspect of the present invention includes:

(a) a step of generating physical layer information related to a physical layer of data in accordance with processing to transmit/receive the data; and (b) a step of transmitting the data to a destination and also transmitting the physical layer information to a recipient separate from the destination.

Also, in order to achieve the example object described above, a management method according to an example aspect of the present invention is a management method of a network apparatus provided with a physical layer processing unit configured to generate physical layer information related to a physical layer of data in accordance with processing to transmit/receive the data, and a transmission unit configured to transmit the data to a destination and to also transmit the physical layer information to a recipient separate from the destination, the management method including:

(a) a step of acquiring the physical layer information transmitted from the network apparatus; and (b) a step of determining a state of surroundings of the network apparatus based on the acquired physical layer information.

Also, in order to achieve the example object described above, a sensing method according to an example aspect of the present invention is a sensing method employing a network apparatus and a management apparatus, the method including:

(a) a step of, with the network apparatus, generating physical layer information related to a physical layer of data in accordance with processing to transmit/receive the data;

(b) a step of, with the network apparatus, transmitting the data to a destination and also transmitting the physical layer information to the management apparatus separate from the destination;

(c) a step of, with the management apparatus, acquiring the physical layer information transmitted from the network apparatus; and (d) a step of, with the management apparatus, determining a state of surroundings of the network apparatus based on the physical layer information.

In order to achieve the example object described above, in a network apparatus provided with a physical layer processing unit configured to generate physical layer information related to a physical layer of data in accordance with processing to transmit/receive the data, a transmission unit configured to transmit the data to a destination, and a processor, a first computer-readable recording medium according to an example aspect of the present invention includes a program recorded thereon including instructions that cause the processor to carry out:

(a) a step of acquiring the physical layer information; and (b) a step of, through the transmission unit, transmitting the physical layer information to a recipient separate from the destination.

In order to achieve the example object described above, a second computer-readable recording medium according to an example aspect of the present invention includes a program recorded thereon including instructions that cause a computer connected to a network apparatus to carry out:

(a) a step of acquiring, from the network apparatus, physical layer information related to a physical layer of data that was generated in accordance with processing to transmit/receive the data; and (b) a step of determining a state of surroundings of the network apparatus based on the physical layer information.

Advantageous Effects of the Present Invention

As described above, according to the present invention, it is possible to expand the sensing range and reduce cost in a sensing system.

BRIEF DESCRIPTION OF THE DRAWINGS

FIG. 5 shows an example of physical layer information stored in a database of a management apparatus according to an example embodiment of the present invention.

FIG. 6 shows an example of a field state table used in the management apparatus according to this example embodiment.

EXAMPLE EMBODIMENT

Example Embodiment

Following is a description of a network apparatus, a management apparatus, a sensing system, a data transfer method, a management method, a sensing method, and a program according to an example embodiment of the present invention, with reference to FIGS. 1 to 8.

[Device Configuration]

Figure 1:
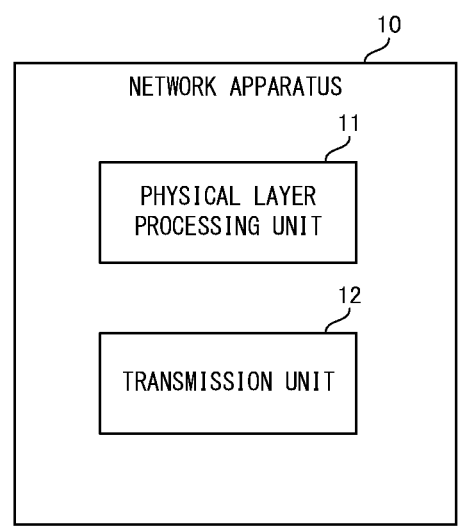
FIG. 1 is a block diagram showing a schematic configuration of a network apparatus according to an example embodiment of the present invention.

First, the configuration of a network apparatus according to this example embodiment will be described. FIG. 1 is a block diagram showing the schematic configuration of the network apparatus according to this example embodiment of the present invention.

A network apparatus 10 in this example embodiment, shown in FIG. 1, is an apparatus configured to relay data transmitted by an electrical cable, an optical cable, or a wireless circuit. As shown in FIG. 1, the network apparatus 10 includes a physical layer processing unit 11 and a transmission unit 12.

The physical layer processing unit 11 is configured to generate physical layer information related to a physical layer of data in accordance with processing to transmit/receive the data. The transmission unit 12 is configured to transmit the data to a destination and to also transmit the physical layer information to a recipient separate from the destination.

In this way, in this example embodiment, the network apparatus 10 can transmit the physical layer information generated by the processing to transmit/receive the data to the outside. Also, the physical layer information includes information that can specify the temperature of a cable, vibration of the cable, a space in the surroundings of the network apparatus, and the like. Therefore, using the network apparatus 10, sensing can be performed without disposing a large number of sensors as in the conventional technology. According to this example embodiment, it is possible to expand the sensing range and reduce cost in the sensing system.

Figure 2:
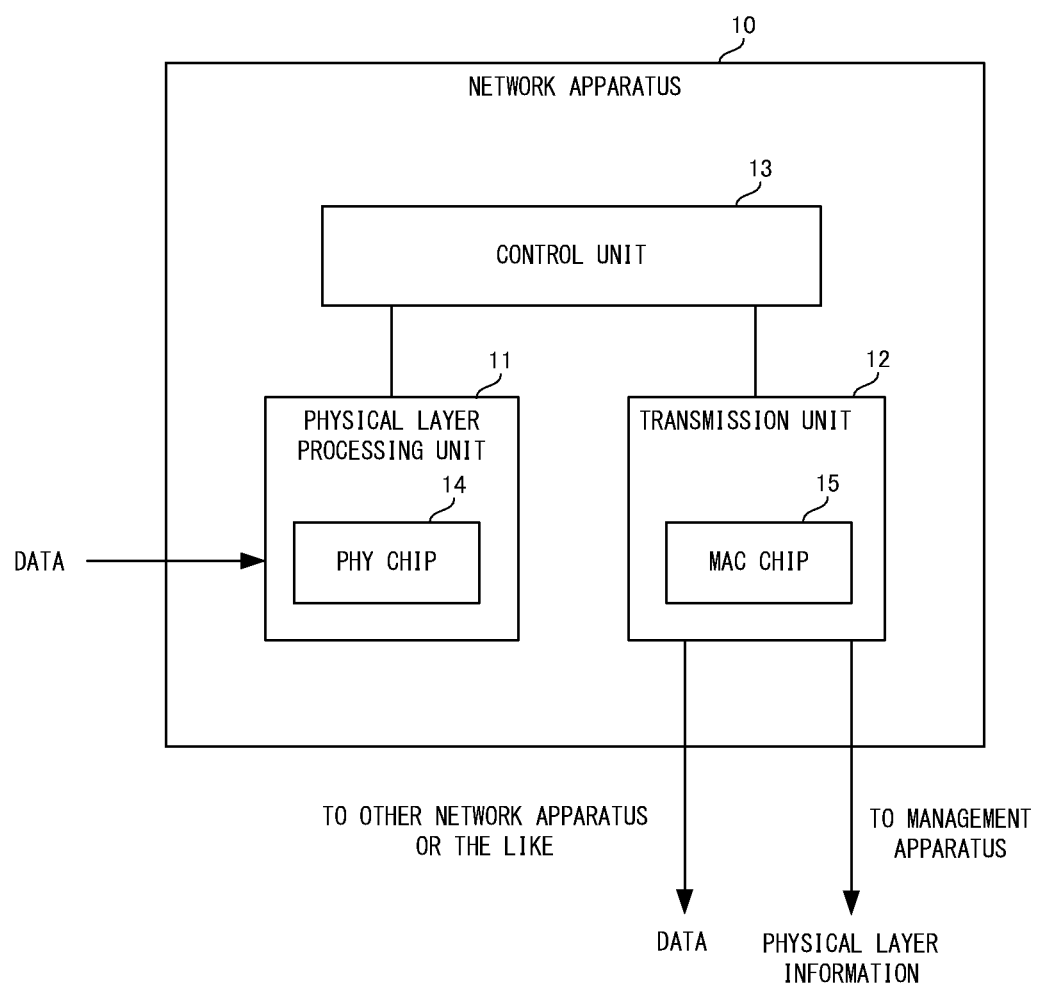
FIG. 2 is a block diagram showing a specific configuration of a network apparatus according to an example embodiment of the present invention.

Next, the configuration of the network apparatus in this example embodiment will be described more specifically with reference to FIG. 2. FIG. 2 is a block diagram showing a specific configuration of a network apparatus according to an example embodiment of the present invention. As shown in FIG. 2, in this example embodiment, in addition to the physical layer processing unit 11 and the transmission unit 12 described above, the network apparatus 10 includes a control unit 13 configured to control those units.

In this example embodiment, the physical layer processing unit 11 includes a PHY (Physical) chip 14. When the network apparatus 10 receives data transmitted from the outside, the PHY chip 14 performs reception processing on the received data. Specifically, the PHY chip 14 performs processing based on a predetermined protocol of the physical layer, for example, shaping processing that shapes a waveform of a signal indicated by the data, or extraction processing that extracts a bit string from a signal indicated by the data. An example of a predetermined protocol of the physical layer is IEEE 802.3 1000 Base-T (PHY standard specification).

Also, when the PHY chip 14 executes processing based on the protocol of the physical layer, information related to an electrical level (hereinafter referred to as "electrical level information"), information related to a radio wave level (hereinafter referred to as "radio wave level information", and information related to a light level (hereinafter referred to as "light level information"), or the like in a signal indicated by data are generated, and registered in a register. In this example embodiment, these items of information registered in the register serve as the physical layer information.

Also, although information defined in the above protocol is cited as an example of the information to be registered in the register, in this example embodiment, information that is not defined in the above protocol may also be registered in the register. For example, information related to noise of data to be extracted in the shaping processing or the extraction processing may be registered in the register. In this case, information related to noise is also included in the physical layer information.

The PHY chip 14 can also execute the processing based on a predetermined protocol of the physical layer with respect to data transmitted from the transmission unit 12. In this case as well, the PHY chip 14 generates information in the same manner as in the case of reception, and registers these items of information in the register. In this example embodiment, the information registered in the register at the time of transmission also serves as the physical layer information.

Also, a plurality of the PHY chips 14 may be provided in one network apparatus 10. In this case, it is possible to use some of the PHY chips 14 for reception, and to use other of the PHY chips 14 for transmission.

In this example embodiment, the transmission unit 12 includes a MAC (Media Access Control) chip 15. When receiving data for transmission from the PHY chip 14, the MAC chip 15 extracts a MAC frame from a bit string of the received data according to a predetermined specification, and determines whether or not the extracted MAC frame is correct. If the MAC frame is correct, the MAC chip 15 specifies the MAC address of the destination, and transmits the MAC frame to the specified MAC address.

Also, when physical layer information has been generated, the MAC chip 15 generates a MAC frame using the physical layer information according to an instruction of the control unit 13, and transmits the generated MAC frame to an instructed recipient.

The control unit 13 instructs the physical layer processing unit 11 to generate physical layer information. Also, the control unit 13 instructs the transmission unit 12 to transmit the physical layer information to a recipient that has been set. In this example embodiment, the control unit 13 is a processor provided in the network apparatus 10. Also, a management apparatus forming a sensing system to be described later is an example of the recipient of the physical layer information (see FIG. 4).

Specifically, the control unit 13 first reads the physical layer information from the register of the physical layer processing unit 11 using an interface accessible to the PHY chip 14. Then, the control unit 13 causes the transmission unit 12 to transmit the physical layer information that was read.

Also, in this example embodiment, it is also possible for the control unit 13 to cause the transmission unit 12 to transmit the physical layer information only when the physical layer information includes information that satisfies a condition set in advance. An example of such a condition is a condition under which it is assumed that an error has occurred at the data transmission source or in the data transmission path (hereinafter referred to as an "error condition").

Also, the control unit 13 can add time information to the physical layer information. An example of the time information is time information that specifies a time when data was received. In this case, the transmission unit 12 transmits the physical layer information with the time information added to the recipient that was set.

[Device Operation]

Figure 3:
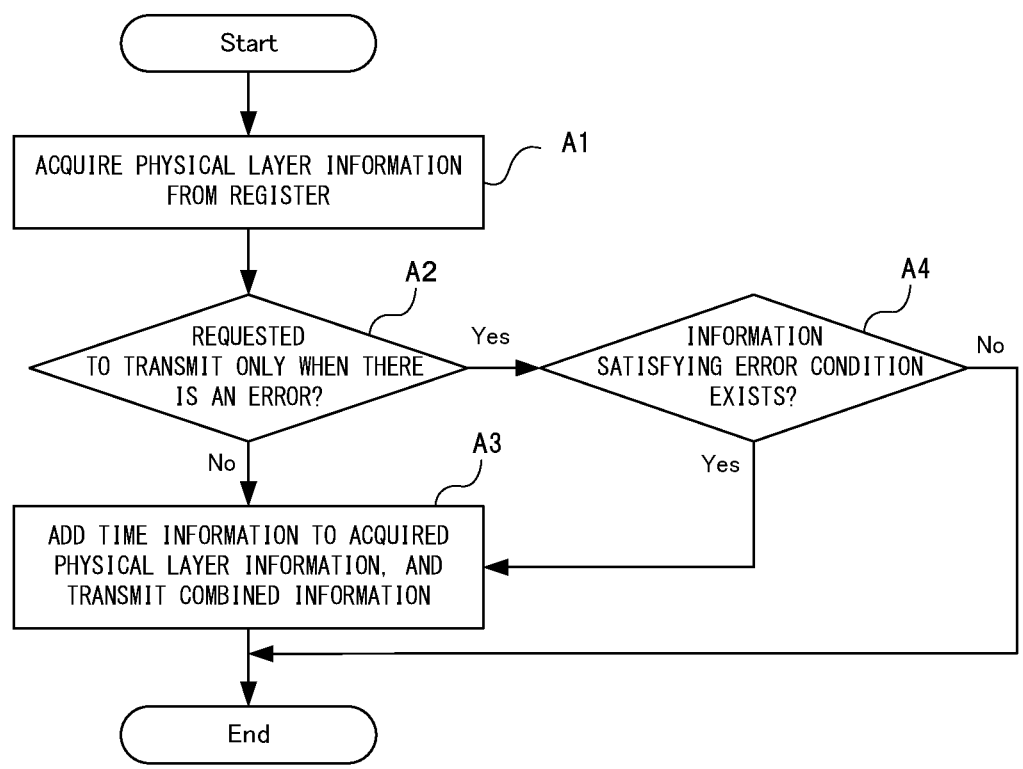
FIG. 3 is a flowchart showing operation of a network apparatus according to an example embodiment of the present invention.

Next, operation of the network apparatus 10 according to this example embodiment of the present invention will be described with reference to FIG. 3. FIG. 3 is a flowchart showing operation of the network apparatus according to this example embodiment of the present invention. The following description refers to FIGS. 1 and 2 as appropriate.

Note that in the following description, the recipient of the physical layer information is assumed to be a management apparatus forming a sensing system described later (see FIG. 4). Also, in this example embodiment, a data transfer method is implemented by operating the network apparatus 10. Thus, the description of the data transfer method in this example embodiment can be replaced with the description of operation of the network apparatus 10 below.

As shown in FIG. 3, first, the control unit 13 acquires physical layer information from the register of the physical layer processing unit 11 using an interface accessible to the PHY chip 14 (step A1).

Next, the control unit 13 determines whether or not the management apparatus of the sensing system has given an instruction to transmit the physical layer information only when there is an error (step A2).

When the result of the determination in step A2 is that the management apparatus has not given an instruction to transmit the physical layer information only when there is an error, the control unit 13 adds the time information to the physical layer information acquired in step A1, and causes the transmission unit 12 to transmit the physical layer information with the time information added to the management apparatus (step A3). Note that the instruction to transmit the physical layer information only when there is an error will be described later with reference to FIG. 4.

On the other hand, when the result of the determination in step A2 is that the management apparatus has instructed to transmit the physical layer information only when there is an error, the control unit 13 determines whether or not information satisfying the error condition exists in the physical layer information that was acquired in step A1 (step A4).

When the result of the determination in step A4 is that information satisfying the error condition exists, the control unit 13 executes step A3. On the other hand, when the result of the determination in step A4 is that information satisfying the error condition does not exist, the control unit 13 ends processing.

The above steps A1 to A4 are repeatedly executed at a set interval. Thus, the management apparatus forming the sensing system described later can accumulate physical layer information along a time series.

[Program: Network Apparatus]

A first program according to this example embodiment may be a program that causes a processor (the control unit 13) of the network apparatus 10 to execute steps A1 to A4 shown in FIG. 3. By installing this program in the network apparatus 10 and executing the program, it is possible to realize the network apparatus 10 and the data transfer method according to this example embodiment.

[System Configuration]

Next is a description of the configuration of a sensing system according to this example embodiment. FIG. 4 is a block diagram showing a configuration of a sensing system according to an example embodiment of the present invention.

Figure 4:
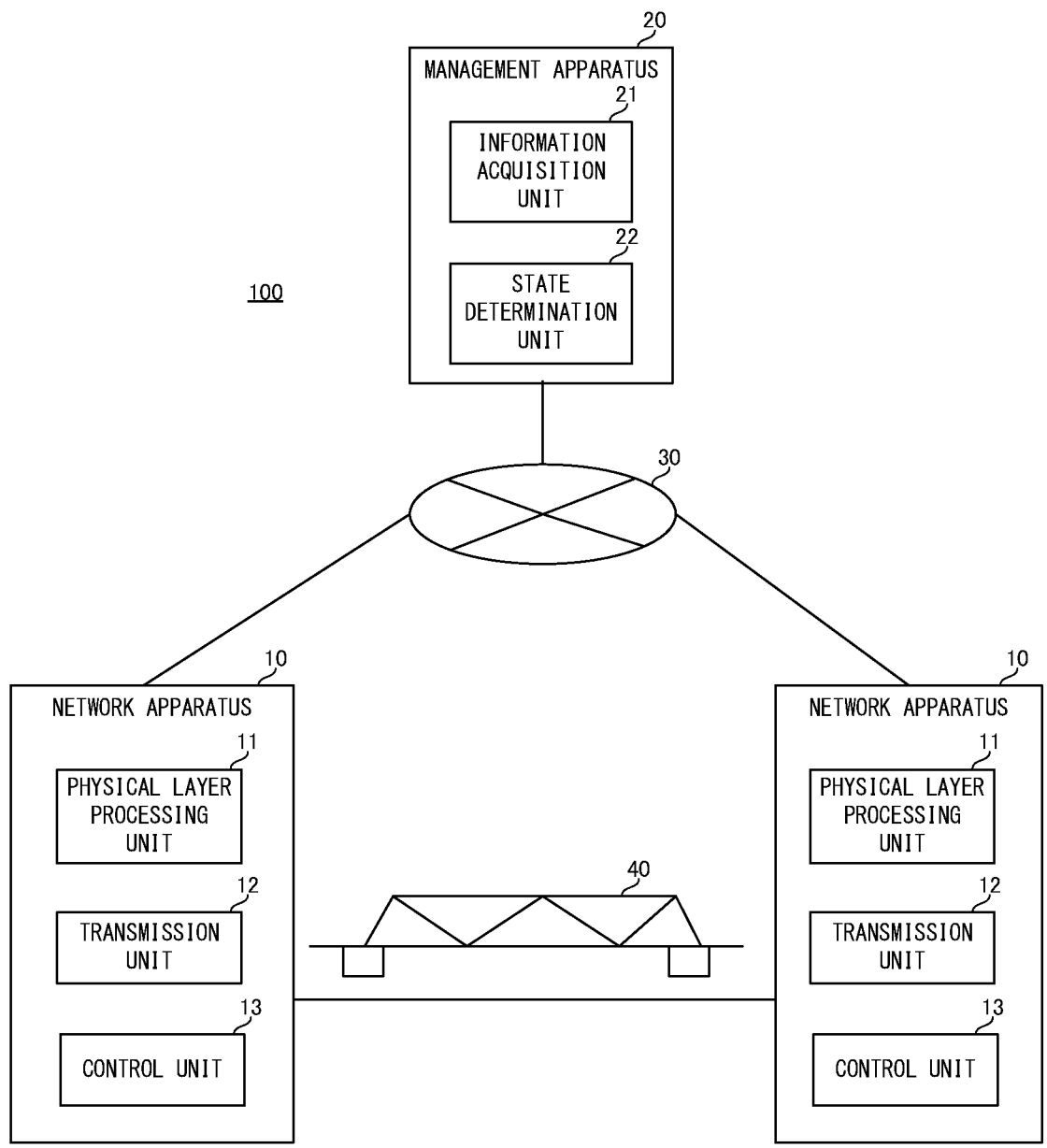
FIG. 4 is a block diagram showing a configuration of a sensing system according to an example embodiment of the present invention.

As shown in FIG. 4, a sensing system 100 according to this example embodiment is provided with the network apparatus 10 and a management apparatus 20. In this example embodiment, the network apparatus 10 and the management apparatus 20 are connected through a network 30 such as the Internet.

Also, as shown in FIG. 4, the network apparatus 10, as shown in FIGS. 1 and 2, includes the physical layer processing unit 11, the transmission unit 12, and the control unit 13. Furthermore, in this example embodiment, a plurality of network apparatuses 10 are provided. Also, in the example shown in FIG. 4, the network apparatuses 10 transmit data to each other through electrical cables or optical fiber cables. In addition, electrical cables or fiber optic cables are laid along an infrastructure facility 40.

Furthermore, as shown in FIG. 4, the management apparatus 20 is provided with an information acquisition unit 21 and a state determination unit 22. The information acquisition unit 21 acquires the physical layer information transmitted from the network apparatuses 10. Also, in this example embodiment, the information acquisition unit 21 can give an instruction to the network apparatuses 10 to transmit the physical layer information only when there is an error. In this case, it is possible to suppress the amount of data transmitted, and therefore possible to suppress a speed reduction of the network.

The state determination unit 22 determines the state of surroundings of the network apparatus 10 based on the acquired physical layer information. Also, when time information has been added to the physical layer information, the state determination unit 22 determines a time-series change in the state of surroundings of the network apparatus 10 based on the time information.

In this example embodiment, the management apparatus 20 is also provided with a database 23 that stores the acquired physical layer information. In this example embodiment, the information acquisition unit 21 periodically receives the physical layer information that has been transmitted from each network apparatus 10, and stores the received information along a time series in the database 23.

Specifically, the state determination unit 22 determines the state of the surroundings of the network apparatuses 10 or cables based on a table (hereinafter referred to as a "field state table"), set in advance, that defines the relationship between the content of physical layer information and the state of the surroundings of the network apparatuses 10.

Here, determination processing of the state determination unit 22 will be described with reference to FIGS. 5 and 6. FIG. 5 shows an example of physical layer information stored in a database of a management apparatus according to an example embodiment of the present invention. FIG. 6 shows an example of a field state table used in the management apparatus according to this example embodiment.

In the example shown in FIG. 5, the physical layer information obtained from each of three network apparatuses 10 is stored in a time series. In FIG. 5, the network apparatuses 10 are respectively described as a "network apparatus A", a "network apparatus B", and a "network apparatus C". Also, the network apparatuses A and C are connected to an electrical cable, and transmit electrical level information as the physical layer information. The network apparatus B is connected to an optical cable, and transmits light level information as the physical layer information. Also, "Linkdown error" in FIG. 5 indicates that communications are interrupted.

Also, as shown in FIG. 6, the electrical level information and the light level information are each information including a level value. In the example of FIG. 6, each field state table defines the cable state for each level value. Specifically, a field state table T01 defines, for the light level information, acceleration occurring in the cable for each level value. Also, a field state table T02 defines, for the electrical level information, the temperature of the cable for each level value.

Accordingly, in the example shown in FIGS. 5 and 6, at time 00:00:20, for example, the state determination unit 22 determines that a temperature abnormality has occurred in the cable to which the network apparatus A is connected.

Also, at time 00:00:40, the state determination unit 22 determines that an earthquake with seismic intensity 2 has occurred in the laying area of the cable to which the network apparatus B is connected, and at time 00:00:50 the state determination unit 22 determines that the seismic intensity has increased. Furthermore, at time 00:01:00, the state determination unit 22 determines that communications have been interrupted in all of the network apparatuses A to C. Also, the state determination unit 22 further determines the state of the infrastructure facility 40 from the above determination results.

[System Operation]

Figure 7:
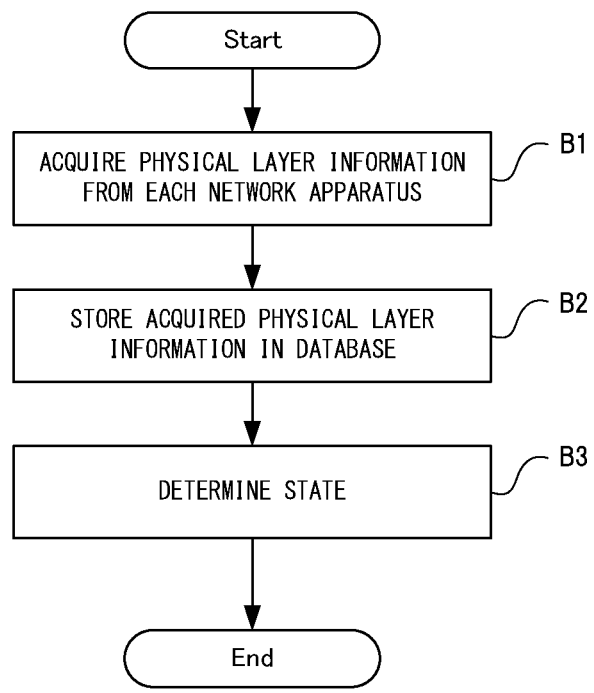
FIG. 7 is a flowchart showing operation of the sensing system of the present invention.

Next, operation of the sensing system 100 according to this example embodiment will be described with reference to FIG. 7. FIG. 7 is a flowchart showing operation of the sensing system of the present invention. The following description refers to FIGS. 4 to 6 as appropriate. Also, in this example embodiment, a sensing method and a management method are implemented by operating the sensing system 100. Thus, the description of the sensing method and the management method in this example embodiment can be replaced with the description of operation of the sensing system 100 below.

As shown in FIG. 7, first, in the management apparatus 20, the information acquisition unit 21 acquires the physical layer information transmitted from each network apparatus 10 (step B1). Next, the information acquisition unit 21 stores the acquired physical layer information in the database 23 (step B2).

Next, the state determination unit 22 compares the physical layer information acquired in step B1 with the field state table, and determines the state of the surroundings of the network apparatuses 10 or the cable for each network apparatus 10 (step B3).

In step B3, the state determination unit 22 can also comprehensively judge the determination results of each network apparatus 10. Furthermore, the state determination unit 22 can perform a judgment by comparing the determination result obtained in step B3 with past determination results. For example, when vibration sequentially occurs along the time series in a plurality of network apparatuses 10, and afterward communications are interrupted in each of the network apparatuses 10, the state determination unit 22 determines that an earthquake has occurred over a wide area.

The above steps B1 to B3 are repeatedly executed at a set interval. Thus, the sensing system 100 can monitor the state of the surroundings of the network apparatuses 10 or the cable for each network apparatus 10.

[Program: Management Apparatus]

A second program according to this example embodiment may be a program that causes a computer to execute steps B1 to B3 shown in FIG. 7. By installing this program in the computer and executing the program, the management apparatus 20, the management method, and the sensing method according to this example embodiment can be realized. In this case, a processor of the computer performs processing to function as the information acquisition unit 21 and the state determination unit 22. Also, in this example embodiment, the database 23 can be realized by storing a data file forming the database 23 in a storage device such as a hard disk provided in the computer.

Also, the program according to this example embodiment may be executed by a computer system constructed using a plurality of computers. In this case, for example, each computer may respectively function as either of the information acquisition unit 21 and the state determination unit 22. Also, the database 23 may be constructed on a computer other than the computer that executes the program according to this example embodiment.

Figure 8:
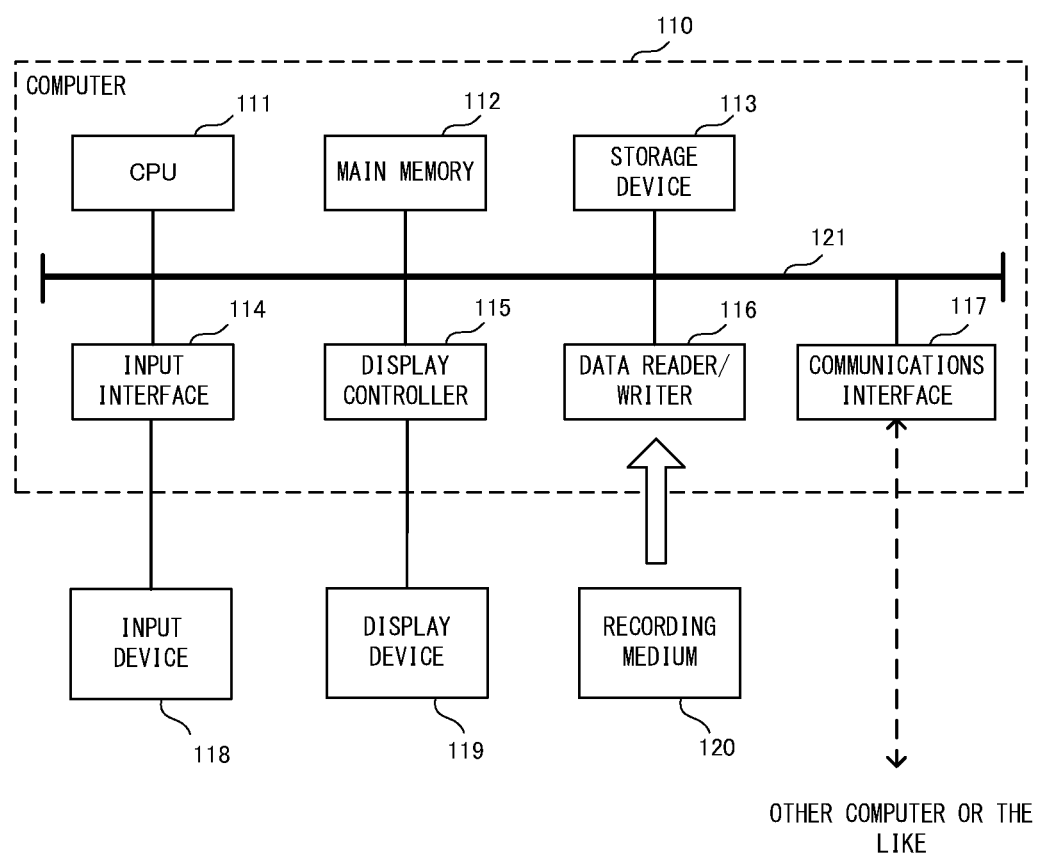
FIG. 8 is a block diagram showing an example of a computer configured to realize a management apparatus according to an example embodiment of the present invention.

Here, a computer that realizes the management apparatus 20 by executing the program according to this example embodiment will be described with reference to FIG. 8. FIG. 8 is a block diagram showing an example of a computer that realizes the management apparatus according to an example embodiment of the present invention.

As shown in FIG. 8, the computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may also include a GPU (Graphics Processing Unit) or an FPGA (Field-Programmable Gate Array) in addition to the CPU 111 or instead of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Note that the management apparatus 20 according to this example embodiment can be realized not only by a computer with a program installed, but also by using hardware corresponding to each part. Further, a configuration may be adopted in which a portion of the management apparatus 20 is realized by a program, and the remaining portions are realized by hardware.

Some portion or all of the example embodiments described above can be realized according to (supplementary note 1) to (supplementary note 15) described below, but the below description does not limit the present invention.

(Supplementary Note 1)

A network apparatus, including:

a physical layer processing unit configured to generate physical layer information related to a physical layer of data in accordance with processing to transmit/receive the data; and a transmission unit configured to transmit the data to a destination and to also transmit the physical layer information to a recipient separate from the destination.

(Supplementary Note 2)

The network apparatus according to supplementary note 1, wherein the processing to transmit/receive the data is processing based on a protocol of a predetermined physical layer.

(Supplementary Note 3)

The network apparatus according to supplementary note 2, wherein the processing to transmit/receive the data is shaping processing that shapes a waveform of a signal indicated by the data, or extraction processing that extracts a bit string from the data.

(Supplementary Note 4)

The network apparatus according to supplementary note 3, wherein the physical layer information includes noise of the data to be extracted in the shaping processing or the extraction processing.

(Supplementary Note 5)

The network apparatus according to any of supplementary notes 1 to 4, wherein the physical layer information includes, in a signal indicated by the data, at least one of information related to an electrical level, information related to a radio wave level, and information related to a light level.

(Supplementary Note 6)

The network apparatus according to any of supplementary notes 1 to 5, wherein the transmission unit is configured to transmit the physical layer information to the separate recipient with time information added to the physical layer information.

(Supplementary Note 7)

The network apparatus according to any of supplementary notes 1 to 6, wherein the transmission unit is configured to transmit the physical layer information to the separate recipient when an error has been detected.

(Supplementary Note 8)

A management apparatus connected to a network apparatus provided with a physical layer processing unit configured to generate physical layer information related to a physical layer of data in accordance with processing to transmit/receive the data, and a transmission unit configured to transmit the data to a destination and to also transmit the physical layer information to the management apparatus separate from the destination, the management apparatus including:

an information acquisition unit configured to acquire the physical layer information transmitted from the network apparatus; and a state determination unit configured to determine a state of surroundings of the network apparatus based on the acquired physical layer information.

(Supplementary Note 9)

A sensing system including:

a network apparatus, and a management apparatus, wherein the network apparatus includes:

a physical layer processing unit configured to generate physical layer information related to a physical layer of data in accordance with processing to transmit/receive the data, and a transmission unit configured to transmit the data to a destination and to also transmit the physical layer information to the management apparatus separate from the destination, and the management apparatus includes:

an information acquisition unit configured to acquire the physical layer information transmitted from the network apparatus, and a state determination unit configured to determine a state of surroundings of the network apparatus based on the acquired physical layer information.

(Supplementary Note 10)

The sensing system according to supplementary note 9, wherein in the network apparatus, the transmission unit is configured to transmit the physical layer information to the management apparatus with time information added to the physical layer information, and in the management apparatus, the state determination unit is configured to also determine a time-series change in the state of surroundings of the network apparatus based on the time information.

(Supplementary Note 11)

A sensing method employing a network apparatus and a management apparatus, the method including:

(a) a step of, with the network apparatus, generating physical layer information related to a physical layer of data in accordance with processing to transmit/receive the data;

(b) a step of, with the network apparatus, transmitting the data to a destination and also transmitting the physical layer information to the management apparatus separate from the destination;

(c) a step of, with the management apparatus, acquiring the physical layer information transmitted from the network apparatus; and (d) a step of, with the management apparatus, determining a state of surroundings of the network apparatus based on the physical layer information.

(Supplementary Note 12)

A data transfer method including:

(a) a step of generating physical layer information related to a physical layer of data in accordance with processing to transmit/receive the data; and (b) a step of transmitting the data to a destination and also transmitting the physical layer information to a recipient separate from the destination.

(Supplementary Note 13)

A management method of a network apparatus provided with a physical layer processing unit configured to generate physical layer information related to a physical layer of data in accordance with processing to transmit/receive the data, and a transmission unit configured to transmit the data to a destination and to also transmit the physical layer information to a recipient separate from the destination, the management method including:

(a) a step of acquiring the physical layer information transmitted from the network apparatus; and (b) a step of determining a state of surroundings of the network apparatus based on the acquired physical layer information.

(Supplementary Note 14)

A computer-readable recording medium in a network apparatus provided with a physical layer processing unit configured to generate physical layer information related to a physical layer of data in accordance with processing to transmit/receive the data, a transmission unit configured to transmit the data to a destination, and a processor, the computer-readable recording medium including a program recorded thereon including instructions that cause the processor to carry out:

(a) a step of acquiring the physical layer information; and (b) a step of, through the transmission unit, transmitting the physical layer information to a recipient separate from the destination.

(Supplementary Note 15)

A computer-readable recording medium including a program recorded thereon including instructions that cause a computer connected to a network apparatus to carry out:

(a) a step of acquiring, from the network apparatus, physical layer information related to a physical layer of data that was generated in accordance with processing to transmit/receive the data; and (b) a step of determining a state of surroundings of the network apparatus based on the physical layer information.

Although the present invention is described above with reference to example embodiments, the present invention is not limited by the above example embodiments. Within the scope of the present invention, various modifications understandable by those skilled in the art can be made to the configurations or details of the present invention.

INCORPORATION BY REFERENCE

This application is based upon and claims the benefit of priority from Japanese application No. 2017-66186, filed on Mar. 29, 2017, the disclosure of which is incorporated herein in its entirety by reference.

INDUSTRIAL APPLICABILITY

As described above, according to the present invention, it is possible to expand the sensing range and reduce cost in a sensing system. The present invention is useful in a system that requires sensing across a wide area, for example, such as an infrastructure facilities management system, a railroad management system, or an earthquake detection system.

DESCRIPTION OF REFERENCE SIGNS

10 Network apparatus
11 Physical layer processing unit
12 Transmission unit
13 Control unit
14 PHY chip
15 MAC chip
20 Management apparatus
30 Network
40 Infrastructure facility
100 Sensing system
110 Computer
111 CPU
112 Main memory
113 Storage device
114 Input interface
115 Display controller
116 Data reader/writer
117 Communications interface
118 Input device
119 Display device
120 Recording medium
121 Bus

The invention claimed is:

1. A network apparatus for transmitting a data via a cable, comprising:

a processor, a PHY chip and a MAC chip, the processor causes the PHY chip to generate a physical layer information which is in regard to a physical layer of a data and includes, in a signal indicated by the data, at least one of information related to an electrical level, information related to a radio wave level, and information related to a light level, with data transmission/reception processing based on a predetermined physical layer protocol, the processor causes the PHY chip to register the physical layer information in a register of the PHY chip, the processor causes the MAC chip to transmit the data to a transmission destination via the cable, and when an error is detected, causes the MAC chip to read the physical layer information from the register, and transmit the read physical layer information to a management apparatus other than the transmission destination, the management apparatus determines a state of the cable based on at least one of the information related to an electrical level, the information related to a radio wave level, and the information related to a light level, wherein the processing to transmit/receive the data is shaping processing that shapes a waveform of a signal indicated by the data, or extraction processing that extracts a bit string from the data.

2. The network apparatus according to claim 1, wherein the physical layer information includes noise of the data to be extracted in the shaping processing or the extraction processing.

3. The network apparatus according to any of claim 1, wherein the physical layer information is transmitted with time information added to the physical layer information.

4. A sensing method employing a network apparatus for transmitting a data via a cable and a management apparatus, the method comprising:

by a PHY chip that is provided with the network apparatus, generating a physical layer information which is in regard to a physical layer of a data and includes, in a signal indicated by the data, at least one of information related to an electrical level, information related to a radio wave level, and information related to a light level, with data transmission/reception processing based on a predetermined physical layer protocol, by the PHY chip, registering the physical layer information in a register of the PHY chip, by the MAC chip that is provided with the network apparatus, transmitting the data to a transmission destination via the cable, and when an error is detected, causes the MAC chip to read the physical layer information from the register, and transmit the read physical layer information to a management apparatus other than the transmission destination, by the management apparatus, determining a state of the cable based on at least one of the information related to an electrical level, the information related to a radio wave level, and the information related to a light level, wherein the processing to transmit/receive the data is shaping processing that shapes a waveform of a signal indicated by the data, or extraction processing that extracts a bit string from the data.

5. A non-transitory computer-readable recording medium in a network apparatus provided with a PHY chip configured to generate a physical layer information which is in regard to a physical layer of a data and includes, in a signal indicated by the data, at least one of information related to an electrical level, information related to a radio wave level, and information related to a light level, with data transmission/reception processing based on a predetermined physical layer protocol, and to register the physical layer information in a register of the PHY chip, a MAC chip to transmit the data to a transmission destination via the cable, and a processor, the computer-readable recording medium including a program recorded thereon including instructions that cause the processor to carry out:

by the PHY chip, acquiring the physical layer information; and by MAC chip, when an error is detected, reading the physical layer information from the register, and transmitting the read physical layer information to a management apparatus other than the transmission destination, the management apparatus determines a state of the cable based on at least one of the information related to an electrical level, the information related to a radio wave level, and the information related to a light level, wherein the processing to transmit/receive the data is shaping processing that shapes a waveform of a signal indicated by the data, or extraction processing that extracts a bit string from the data.

* * * * *